June 11, 1963 A. S. VANDERHOOF 3,093,182

SWAGING TOOL

Filed June 20, 1960 3 Sheets-Sheet 1

INVENTOR
ALTON S. VANDERHOOF

BY
Byerly, Townsend, Watson & Churchill
ATTORNEYS.

June 11, 1963  A. S. VANDERHOOF  3,093,182
SWAGING TOOL

Filed June 20, 1960  3 Sheets-Sheet 2

INVENTOR
ALTON S. VANDERHOOF

BY
Byerly, Townsend, Watson & Churchill
ATTORNEYS.

INVENTOR
ALTON S. VANDERHOOF
BY
*Byerly, Townsend, Watson & Churchill*
ATTORNEYS.

United States Patent Office 3,093,182
Patented June 11, 1963

3,093,182
SWAGING TOOL
Alton S. Vanderhoof, Caldwell, N.J., assignor to Resistoflex Corporation, Roseland, N.J., a corporation of New York
Filed June 29, 1960, Ser. No. 37,141
8 Claims. (Cl. 153—1)

The present invention relates to a swaging tool for crimping the socket of a hose end fitting during assembly of the fitting to a length of hose. More particularly it relates to a portable tool capable of achieving in the field results comparable to that achieved in the factory on production equipment.

Of recent years heavy reliance has been placed by the aircraft industry, as well as others, upon hose assemblies consisting of a reinforced polytetrafluoroethylene (hereinafter abbreviated P.T.F.E.) hose and appropriate end fittings. These hose assemblies have proven attractive because of their wide temperature rating, resistance to chemical attack, and practically indefinite shelf and service life. Rubber and synthetic rubber assemblies cannot begin to be compared with those of P.T.F.E.

Because of the nature of P.T.F.E., however, it was found that conventional rubber hose fitting practice was not satisfactory for providing end fittings for P.T.F.E. hose. Various attempts were made to provide P.T.F.E. hose assemblies with respect to which the end fittings would resist separation from the hose and bar leakage conmensurate with the capabilities of the hose itself. It is believed that at the present time the best all around fitting for P.T.F.E. is one which is permanently attached and compresses the end of the hose including its reinforcement between an internal nipple and an external socket. This is commonly referred to as a swaged fitting.

The present invention is directed to a portable tool for swaging the sockets of swaged fittings, especially P.T.F.E. hose. For a better understanding of the type of fitting which is involved and the presently preferred method for its assembly, reference should be had to United States Letters Patent No. 2,865,094 issued on December 23, 1958, to Irving D. Press and assigned to the same assignee as the present invention.

P.T.F.E. is a comparatively hard surbstance with little elasticity. As a consequence, a very tight grip must be secured upon the end of a hose made of this material in order to effect a fluid seal and, more important, in order to secure the fitting to the hose against blow-off under operating pressure. On the other hand, P.T.F.E. does "flow" to a slight extent under pressure and, unless confined, will extrude slightly from between the socket and the nipple. All of these factors must be taken into account in the design and assembly of the end fittings. With the swaged fitting it is important that the swaging or radial contraction be carried out to the optimum point, compressing the hose enough to establish a seal and maintain a grip without overswaging to the point of weakening the fitting or the hose or both.

From the foregoing it can be seen that the extent of swage for any given fitting is somewhat critical. Therefore, one purpose of the present invention is to provide a portable tool capable of swaging the sockets of fittings covering a wide range of sizes, each to the required optimum extent, with all of the gauging being done automatically as an inherent quality of the tool.

In the aforesaid patent there is described for illustrative reasons a straight hose fitting. However, quite often the portions of the fittings joined to the nipple and socket portions are of complex configuration. Not only elbow fittings are contemplated, but various shapes such as Y's and T's, and complex bends. Sometimes an assembly will have a complex fitting on both ends and this creates a problem as to how to accommodate the various twists and turns of the hose and its fittings within the confines of the swaging tool. It must be remembered that for portability both size and weight must be kept at a minimum. With swaging equipment available prior to the present invention certain fitting configurations could only be assembled in the factory. This placed a great limitation upon the usefulness of P.T.F.E. hose.

It is, therefore, a further object of the present invention to provide a compact swaging tool adapted to accept a full range of end fitting sizes regardless of the complexity of the associated hardware.

The foregoing objects are achieved in accordance with the present invention by providing a swaging tool comprising a generally U-shaped base member, a tapered sizing ring, means supporting the sizing ring in fixed position parallel to and spaced from the base member, a generally U-shaped pressure plate disposed in the space between the sizing ring and the base member aligned with the latter and moveable therebetween, means carried by the base member for urging the pressure plate toward the sizing ring, a plurality of die fingers, and a cage for carrying the fingers in a uniform circular distribution for radial movement, the cage being ring-shaped and divided into two semicircular portions, one portion being aligned with and secured to the pressure plate and detachably carrying the other portion for joint movement into the sizing ring to urge the fingers simultaneously radially inwardly.

The invention will be better understood after reading the following detailed description of a preferred embodiment thereof with reference to the appended drawings in which.

Reference should now be had to the drawings wherein the same reference numerals are used throughout the several figures to designate the same or similar parts.

Figure 3:
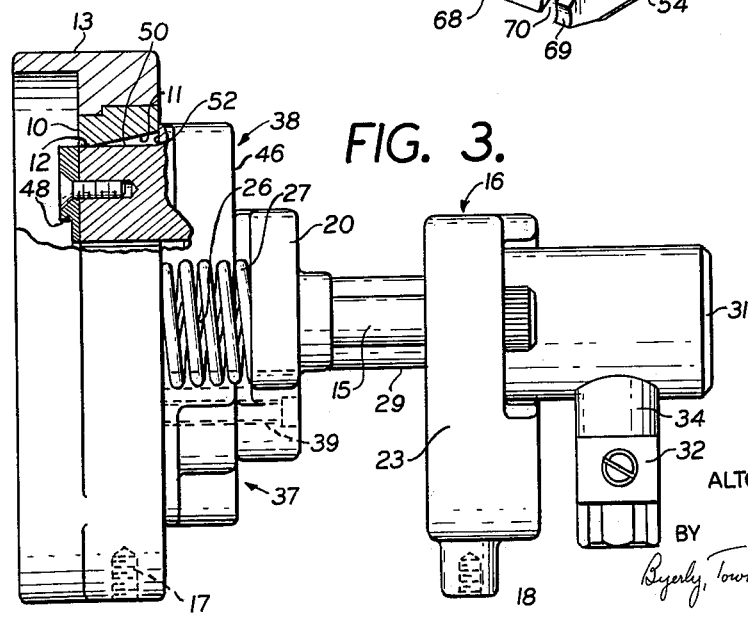
FIG. 3 is a side elevational view with a portion broken away of the swaging tool of FIG. 1.

A sizing ring 10 having a tapered section 11 and an internal cylindrical portion 12 is mounted in a front plate 13. The front plate 13 is supported by the tie rods 14 and 15 in a fixed position parallel to and spaced from a base member 16. Tapped holes 17 and 18, best seen in FIG. 3, are provided for optionally fastening the tool to a work table or bench.

A generally U-shaped pressure plate 19 with opposite arms 20 and 21 is mounted for movement upon the tie rods 14 and 15 in the space between the sizing ring 10 and the base member 16. The pressure plate 19 is aligned with the base member 16 which is also U-shaped with opposite arms 22 and 23.

Compression springs 24 and 25 are mounted on tie rod 14 while similar springs 26 and 27 are mounted on tie rod 15 for urging the pressure plate 19 away from the front plate 13 toward the base 16. The use of dual springs on each tie rod is a matter of design choice in order to obtain the desired spring force within the limits of available space. Means are carried by the base member 16 in the form of a pair of substantially identical hydraulic rams 28 and 29 operating in respective cylinders 30 and 31 threadedly secured to the opposite arms 22 and 23 of the U-shaped base member 16. The rams 28 and 29 engage the opposite arms 20 and 21 of the U-shaped pressure plate 19 to urge the latter toward the sizing ring 10.

A manifold 32 interconnects the inlets 33 and 34 of the cylinders 30 and 31, respectively, to a common inlet 35. The inlet 35 can be connected by a suitable hose to any conventional source of pressure fluid such as a hand-operated hydraulic pump or the like. It should be understood that by employing a pair of identical ram assemblies the fluid pressure will equalize between the two so that balanced forces are developed on opposite arms of the pressure plate 19. This provides for uniform movement of the pressure plate toward the sizing ring 10.

A plurality of identical die fingers 36 are mounted in slots within the cage which is ring-shaped and divided into two semicircular portions 37 and 38. The portion 37 is aligned with and secured to the pressure plate 19 by means of a plurality of bolts of which one is shown in FIG. 3 at 39. The cage portion 38 is provided with two locating pins 40 and 41 which enter, respectively, the locating holes 42 and 43 in the other cage portion 37. When cage portion 38 is supported on cage portion 37, the two portions of the cage are separated from each other by pairs of spacer elements 44 and 45. The spacer elements have comparatively small cross-sections relative to the adjacent ends of the cage sections 37 and 38 in order to minimize the surface contact. This reduces to some extent the problem of improper assembly of the two cage portions due to the presence of foreign particles therebetween.

When the portion 38 is disposed upon the portion 37 with the locating pins 40 and 41 in proper registry with the locating holes 42 and 43, the rear surface 46 of the cage portion 38 will engage the pressure plate 19 as best seen in FIG. 3.

Each of the cage portions are provided with a plurality of equally spaced radial slots for removably receiving the die fingers. The slots are closed on one side by the semicircular cage plates 47 and 48.

The cage portions 37 and 38 are provided with cylindrical body sections 49 and 50 and shoulders 51 and 52, respectively. The diameter of the cylindrical sections 49 and 50 is equal to the diameter of the cylindrical surface 12 of the sizing ring 10. This provides for a piloting fit between the cage and the sizing ring when the cage approaches its fully inserted position relative to the sizing ring as shown in FIG. 3. Also shown in FIG. 3 is the fact that the shoulders 51 and 52 on the cage portions are arranged to engage the edge of the sizing ring thereby acting as a limit stop to predetermine the degree of entry of the cage within the sizing ring.

Figure 1:
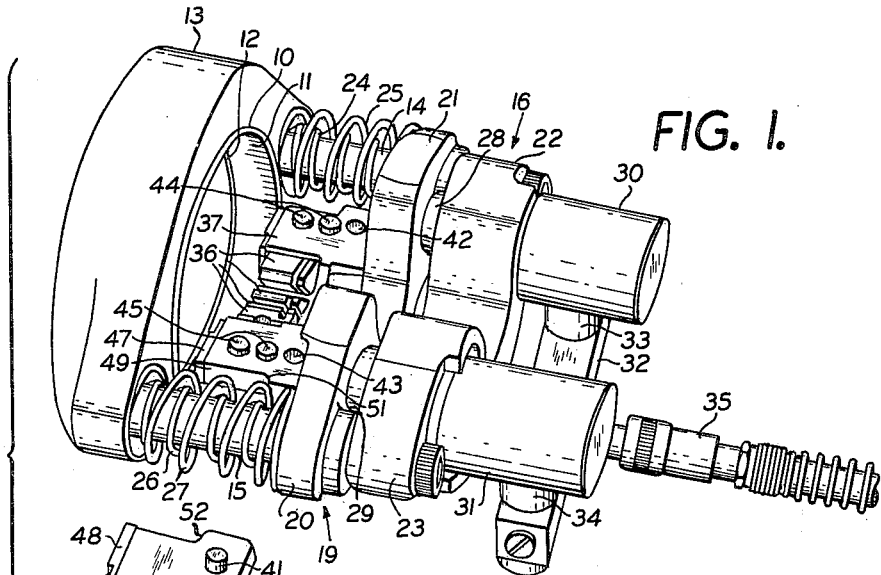
FIG. 1 is a perspective view of the swaging tool with the cage retracted and one-half removed.
Figure 2:
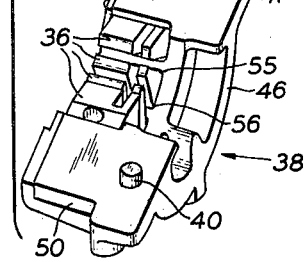
FIG. 2 is an isometric view of one of the die fingers.
Figure 2:
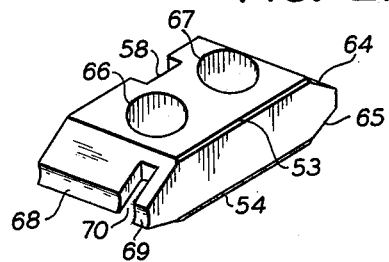

As best seen in FIG. 2, the edges 53 and 54 of the die fingers are chamfered. These chamfers are arranged to coincide with corresponding bevels such as 55 and 56 in the cage portion 38 seen in FIG. 1. It will be observed from FIG. 6 that the heel portion of the die finger is tapered as at 57 for engagement with the tapered surface 11 of the sizing ring. The chamfers such as 53 and 54 on the die finger and the bevels such as 55 and 56 in the cage act as keys to prevent improper insertion of the die finger. Such insertion would result in reversal of the tapered surface 57 causing interference between the die finger and the sizing ring of a nature which would tend to damage the tool.

Figure 4:
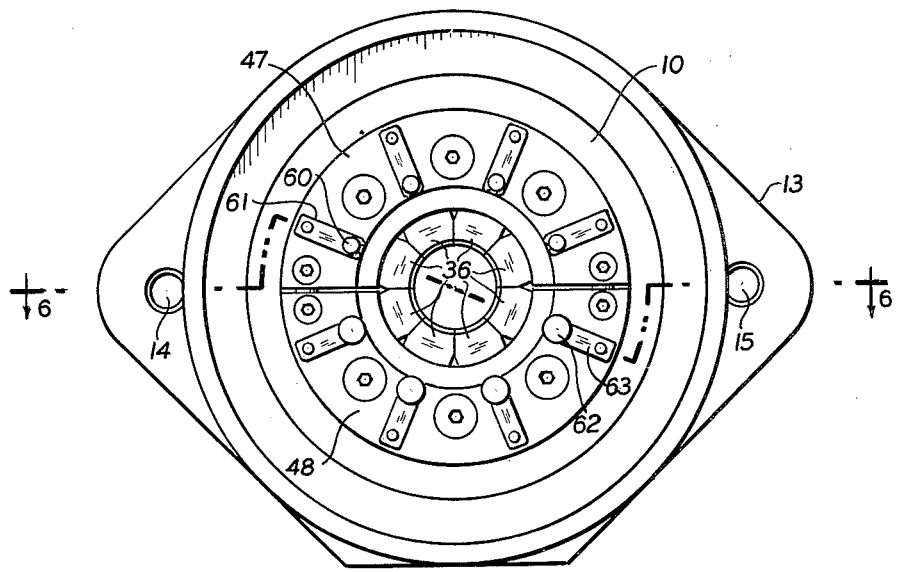
FIG. 4 is a front elevational view of the swaging tool.
Figure 6:
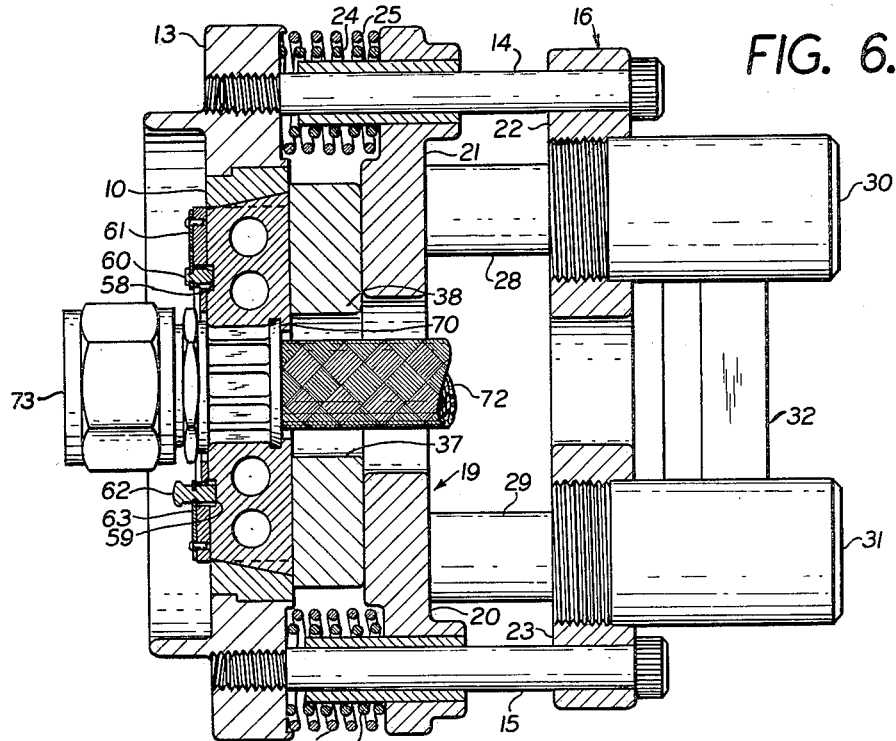
FIG. 6 is a horizontal sectional view taken along line 6—6 in FIG. 4 and showing a hose assembly in fully assembled operative relation.
Figure 7:
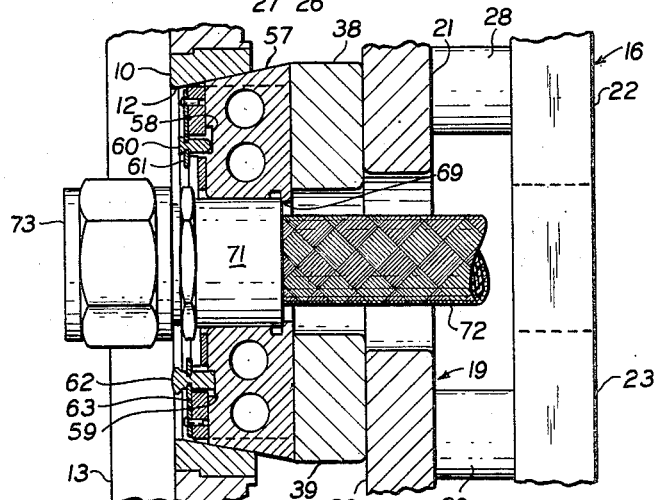
FIG. 7 is a fragmentary view similar to FIG. 6 showing the tool with an unswaged fitting in position immediately prior to swaging.

Referring particularly to FIGS. 2, 6 and 7 it will be seen that the die fingers are provided with cavities such as 58 and 59 which cooperate, respectively, with the round nosed detent 60 spring biased by element 61 and the square nosed detent 62 spring biased by element 63. From FIG. 4 it will be seen that the square nosed detents 62 identifiable by the finger knobs are employed on the fixed cage portion while the round nose detents 60 are employed on the removable cage portion. It should be understood that the round nose detents provide for easy insertion and removal of the die fingers merely by exerting a force thereupon. However, it has been found that if the round nose detents are employed in the fixed cage portion, there is a tendency to knock the fingers out of the cage when a hose fitting is inserted for swaging. The square nosed detent avoids this possibility. At the same time, the finger grip knobs on the square nosed detents assist in removal or insertion of a die finger.

Figure 5:
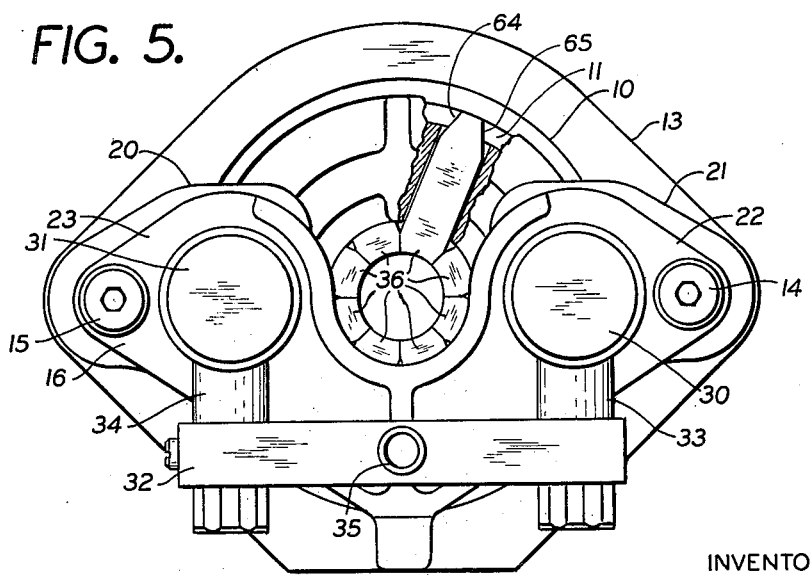
FIG. 5 is a rear elevational view of the swaging tool with a portion broken away.

As best seen in FIG. 5, the rear of the die finger which engages the sizing ring is bevelled such as at 64 and 65 in order to reduce the area contacting the sizing ring. This reduces the retarding friction to a minimum commensurate with the amount of force that must be exerted against the die fingers. The holes such as 66 and 67 in FIG. 2 are included to reduce the weight thereof. When it is realized that a set of eight die fingers are required for each size fitting, it will be appreciated that weight saving features are important for portability.

Referring to FIG. 2, it will be seen that the operative face of the die is divided into two parts, 68 and 69, separated by a relief or notch 70. As best seen in FIG. 7, the part 69 extends or projects radially inwardly of the part 68 and serves as a locating abutment or stop for the end of the socket 71 of the hose end fitting.

The operation of the tool can now be described with reference to FIG. 7. A hose 72 with the socket 71 and a nipple 73 assembled thereto is placed in the fixed portion of the finger cage as shown. Depending upon the configuration and size of the pre-assembled hose and fitting the assembly may be introduced from the right to its position in the fixed portion of the cage, placed directly in position from above, or passed through the sizing ring from left to right. The removable portion of the finger cage is then disposed over the fitting and the entire assembly is slowly advanced into the sizing ring to the position shown with the socket properly located against the finger projections such as 69. Upon the application of further pressure to urge the die cage into the sizing ring, the socket will be swaged or crimped as shown in FIG. 6 until the shoulders on the die cage portions engage the edge of the sizing ring. It should be noted in FIG. 6 that the open end of the socket 71 tends to bell outwardly into the recess such as 70 in the die finger. If the hydraulic pressure is now released the return springs will urge the pressure plate 19 back against the base member 16 so as to expose the portion 38 of the die cage which may be removed. The assembled fitting can now be lifted out of the lower portion 37 of the die cage.

Figure 8:
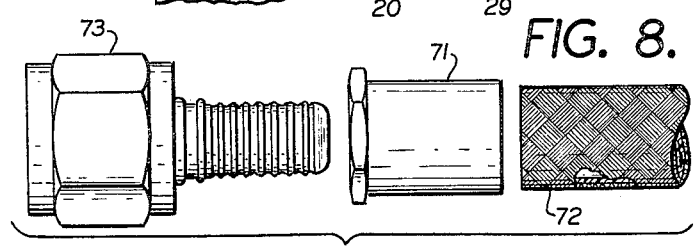
FIG. 8 is an exploded view of the parts of a typical hose end fitting which can be handled by the tool in accordance with the present invention.

For an exploded view of the hose and end fitting components prior to assembly reference should be had to FIG. 8.

It should be readily appreciated from a consideration of FIG. 6 that an elbow or other complex fitting can be associated with the socket 71 without interferring with the operation of the tool. On the other hand, the hose 72 can be bent as a result of preforming or can be provided with another fitting on the end not shown, also without interferring with the operation of the tool. That is, the hose 72 is accommodated in the U-shaped slots in the several members. It should be appreciated from a consideration of FIG. 5 that the use of dual ram assemblies contributes to the development of a free passage for the hose assembly.

Having described the details of a preferred embodiment of the invention, it will be understood by those skilled in the art that numerous changes may be made therein without departing from the true spirit of the invention as defined in the appended claims.

What is claimed is:
1. A swaging tool comprising:
(a) a generally U-shaped base member,
(b) an internally tapered sizing ring rigidly supported in fixed position parallel to and spaced from said base member with an unobstructed axial approach to the opening therein on both sides thereof,
(c) a generally U-shaped pressure plate disposed parallel to and in the space between said sizing ring and said base member and movable therebetween,
(d) means carried by said base member for selectably urging said pressure plate toward said sizing ring,
(e) a plurality of die fingers, and
(f) a cage for carrying said fingers in a uniform circular distribution for radial movement, said cage being ring-shaped and divided into two semicircular portions, one portion being secured to said pressure plate parallel thereto on the side facing said sizing ring and detachably carrying the other portion for joint movement into said sizing ring, said fingers being engaged by the sizing ring when the cage is moved therein to urge the fingers simultaneously radially inwardly,
the U-shaped base member, U-shaped pressure plate, and cage portion secured to said pressure plate all being oriented in the same direction to provide collectively an unobstructed U-shaped channel co-axial with said sizing ring and cooperating therewith to provide an axial passage completely through the tool for accommodating an article to be swaged.

2. A swaging tool according to claim 1, wherein said cage is provided with a shoulder for engaging said sizing ring when a predetermined portion of the cage has entered the ring thereby to limit the radially inward movement of said fingers.

3. A swaging tool according to claim 1, wherein said sizing ring is provided with an internal cylindrical surface at the end of its tapered section remote from said pressure plate, and said cage is provided with a complementary cylindrical surface for piloted entry into the cylindrical surface of said sizing ring.

4. A swaging tool according to claim 1, wherein the means for urging the pressure plate toward the sizing ring comprises a pair of substantially identical hydraulic ram assemblies secured to opposite arms of the U-shaped base member with the rams positioned for engaging opposite arms of the U-shaped pressure plate, and a manifold with a pressure inlet interconnecting the inlets to said pair of ram assemblies for equalized operation thereof.

5. A swaging tool according to claim 1, wherein said die fingers are each provided with a projection adjacent the working surface thereof for cooperatively positioning the article to be swaged relative to the working surface.

6. A swaging tool according to claim 1, wherein the two portions of said cage are separated by spacer elements of comparatively small individual and total cross-section when the portions are assembled for entry into the sizing ring to minimize the surface contact between the mating ends of said cage portions.

7. A swaging tool according to claim 1, wherein said cage portions are each provided with a plurality of equally spaced radial slots for removably receiving the die fingers, a like number of spring biased detents cooperating with said slots, and a detent receiving cavity in each of said die fingers for selectably retaining said fingers in said cage portions, said cavities being larger than the corresponding detents to allow for said radial movement.

8. A swaging tool according to claim 1, wherein said die fingers and said cage are keyed to prevent insertion of a die finger in a manner which would damage the tool.

References Cited in the file of this patent
UNITED STATES PATENTS

| | | |
|---|---|---|
| 1,782,219 | Wallace | Nov. 18, 1930 |
| 2,002,502 | Douglas | May 28, 1935 |